United States Patent [19]

Arribas et al.

[11] 4,446,359

[45] May 1, 1984

[54] PEAK LOAD CONTROL FOR AN ELECTRIC HEATING SYSTEM

[75] Inventors: Cecilio Arribas, Laon; Rene' E. Blassiau, Nevers, both of France

[73] Assignee: Noirot-MT, Paris, France

[21] Appl. No.: 324,451

[22] Filed: Nov. 24, 1981

[51] Int. Cl.³ .............................................. H05B 1/02
[52] U.S. Cl. ............................... 219/485; 219/486; 219/508; 219/490; 307/39; 307/41
[58] Field of Search ............... 219/490, 491, 492, 493, 219/494, 497, 483–486, 508–510; 307/39–41

[56] References Cited

U.S. PATENT DOCUMENTS

| | | | |
|---|---|---|---|
| 3,787,729 | 1/1974 | Bennett | 219/486 |
| 4,160,153 | 7/1979 | Melander | 219/492 |
| 4,168,491 | 9/1979 | Phillips et al. | 307/39 |
| 4,216,384 | 8/1980 | Hurley | 307/39 |

Primary Examiner—M. H. Paschall

Attorney, Agent, or Firm—Schwartz, Jeffery, Schwaab, Mack, Blumenthal & Koch

[57] ABSTRACT

A peak load control apparatus with operating mode selection for an electric heating system having a plurality of electric heating units arranged in two or more groups in different rooms is disclosed. When the current carried by the feeder line exceeds a predetermined value a peak load trigger or flip-flop which receives a signal proportional to the feeder current from a detector delivers a peak load signal to a first control circuit or monostable which cuts power to a first selected group of heating units for a predetermined period, and to a second time control circuit or monostable which cuts power to a second selected group of heating substantially at the end of the period during which power is cut off to the first group of heating units. The heating units are provided with programmable thermostats connected to operating mode selector switches which are connected to the feeder line.

4 Claims, 3 Drawing Figures

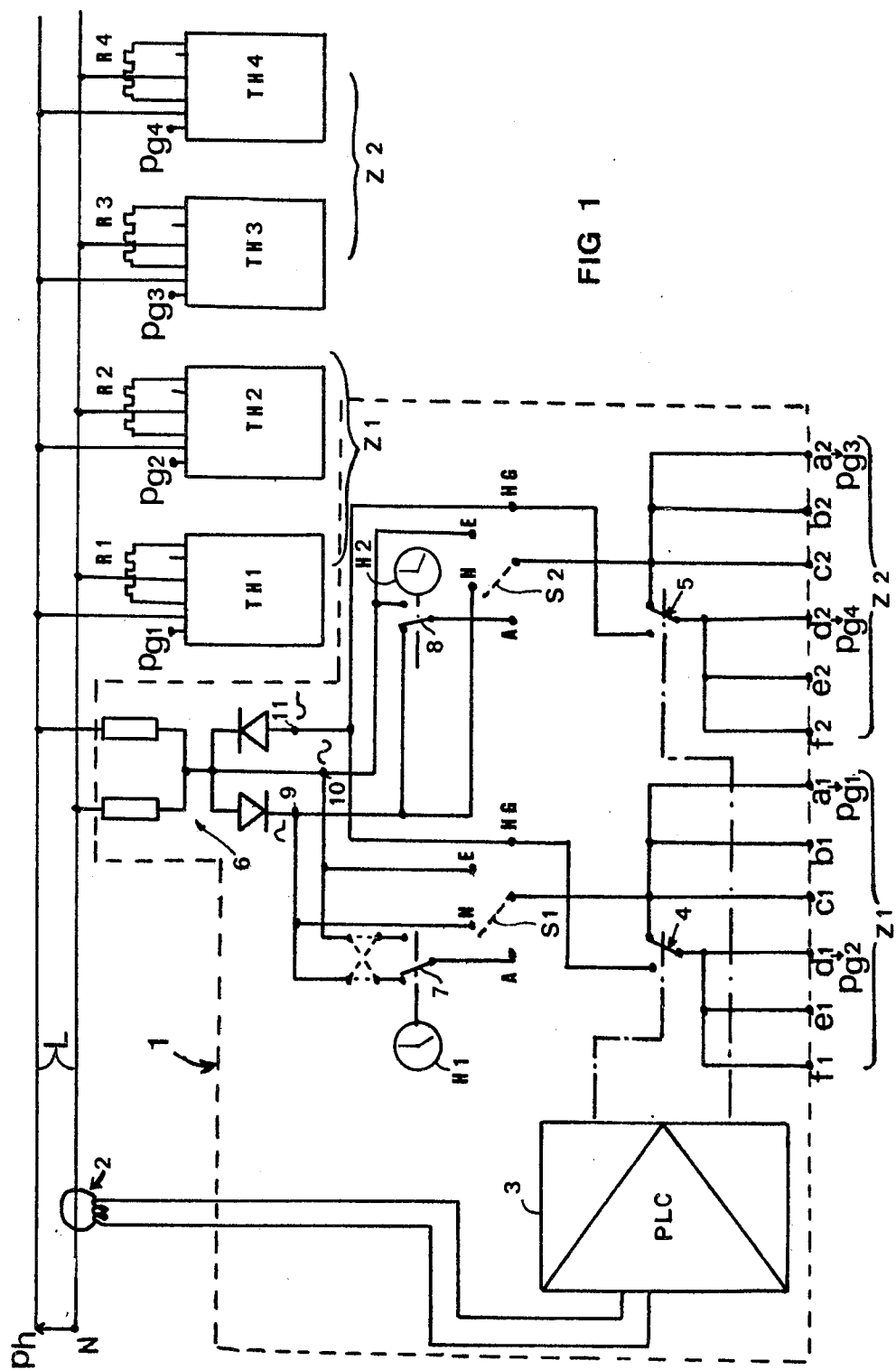

PEAK LOAD CONTROL FOR AN ELECTRIC HEATING SYSTEM

FIELD OF THE INVENTION

The present invention relates to peak load control particularly for an electric heating system.

OBJECT AND SUMMARY OF THE INVENTION

An object of the invention is to provide peak load control for preventing excess consumption of electric energy while ensuring optimum heating.

According to a first aspect of the invention there is provided a method of peak load control for an electric heating system including a plurality of electric heating units such as heaters or radiators. The heating units are divided into two or more groups which are supplied by the same feeder line. A peak load current is detected above a predetermined adjustable value. Upon detection of the peak load one or more groups of heating units power is cut off in succession and then reconnected. The cycle is repeated if the load current continues to exceed the predetermined adjustable value.

According to another aspect of the invention there is provided a peak load control apparatus for an electric heating system including a plurality of electric heating units. The plurality of electric heating units are divided into two or more groups which are supplied by the same feeder line. Detection means detects the current carried by the feeder line and provides a signal proportional to the current. Peak load trigger means is connected to the detection means for delivering a signal when the current detected by the detection means exceeds a predetermined limit. A first time control means is interposed between the peak load trigger means and a first group of electric heating units for a predetermined adjustable period, and a second time control means interposed between the peak load trigger means and a second group of electric heating units for cutting off power to the second group of electric heating units for a predetermined adjustable period substantially at the end of the predetermined period during which power to the first group of radiators is cut off.

The electric heating units are, for example, located in various rooms of a residence and the duration of the load control cycle (i.e., the time lapse between the moment power to the first group of electric heating units is cut off and the moment the end of the period during which power to the second group of electric heating units is cut off) is of the order of a few minutes so that in case of repeated cycles temperature differentials between rooms will be avoided which would otherwise have been caused by prolonged cutting off of power to one or more electric heating units.

This is the simplest application of the above method of load control. It is evident that the peak load control system according to the invention may applied to more than two groups of radiators. It suffices to provide as many time control means as there are electric heating units; the various time control means or circuits are selectively or sequentially energized in accordance with a predetermined cycle, the total duration and duration of the separate phases being adjustable at will.

Likewise the present peak load control apparatus may be incorporated into a more sophisticated programmed heating system.

Such an application will now be described with reference to the accompanying drawings.

BRIEF DESCRIPTION OF THE DRAWINGS

FIG. 1 is an overall schematic showing of an electric heating system with peak load control and operating mode selection embodying of the invention.

The heating system illustrated schematically in FIG. 1 comprises a plurality of electric heating units such as space heaters or radiators supplied in parallel from a common feeder line L.

For the sake of simplification, only four of the radiators $R_1$ to $R_4$ are shown, radiators $R_1$ and $R_2$ being part of a first area Z1 and two other radiators $R_3$ and $R_4$ being part of a second area Z2. The peak load control operates only on radiators $R_2$ in area Z1 and radiators $R_4$ in area Z2. This arrangement is of course purely by way of example since peak load control may operate over all or part of the radiators in a given heating area or, in the contrary, on a group of radiators arranged in different heating areas.

Each radiator $R_1$ to $R_4$ is associated with a thermostat, respectively $Th_1$ to $Th_4$, with a control input terminal Pg1 to Pg4.

The heating system of FIG. 1 comprises a peak load control apparatus with operating mode selection designated by reference 1, the component parts of this control apparatus are arranged in a control cabinet.

The peak load control system 1 comprises a current transformer 2 arranged on one of the wires (preferably the neutral) of the feeder line L.

Figure 2A:
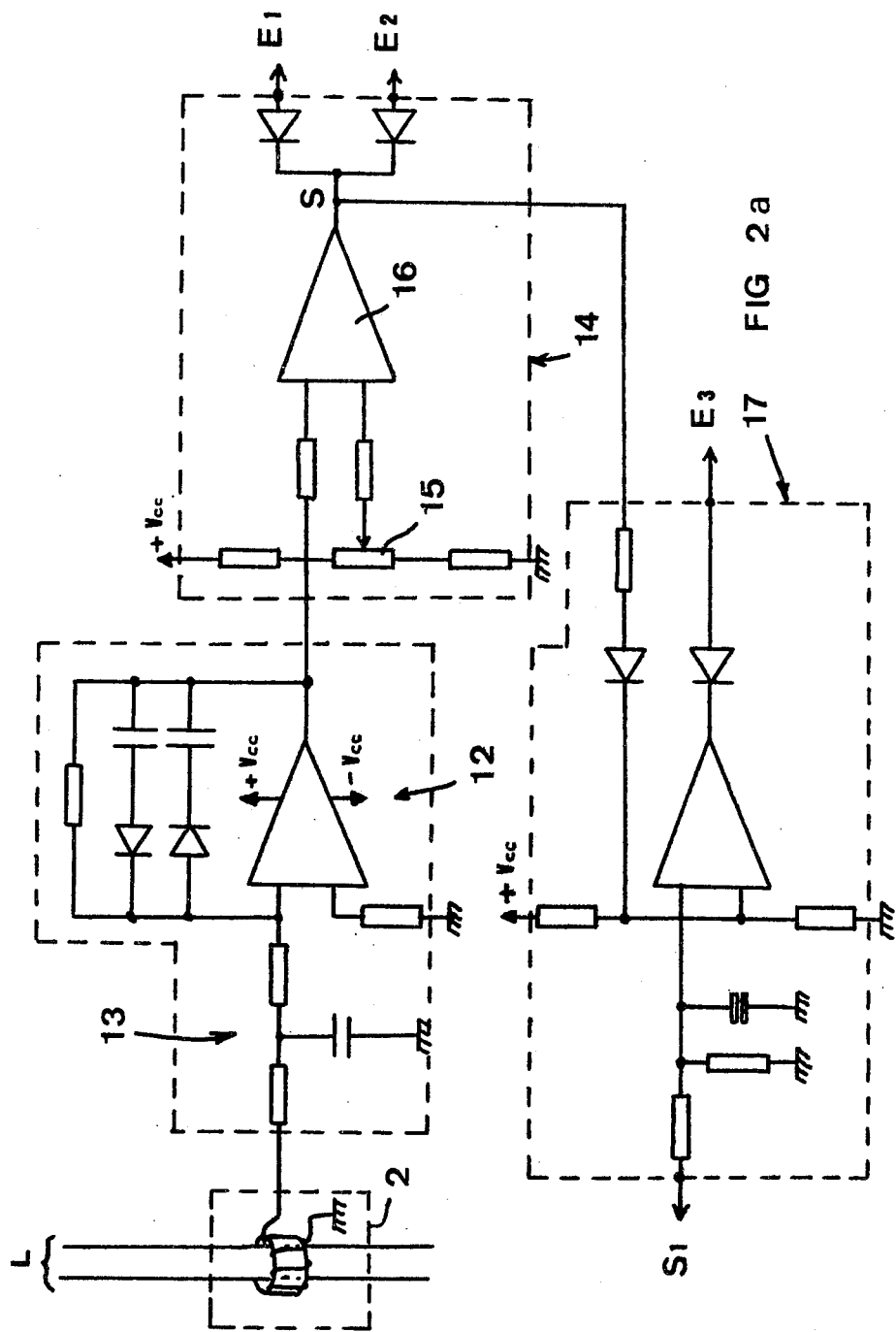
FIGS. 2a and 2b are circuit diagrams of the peak load controller.
Figure 2B:
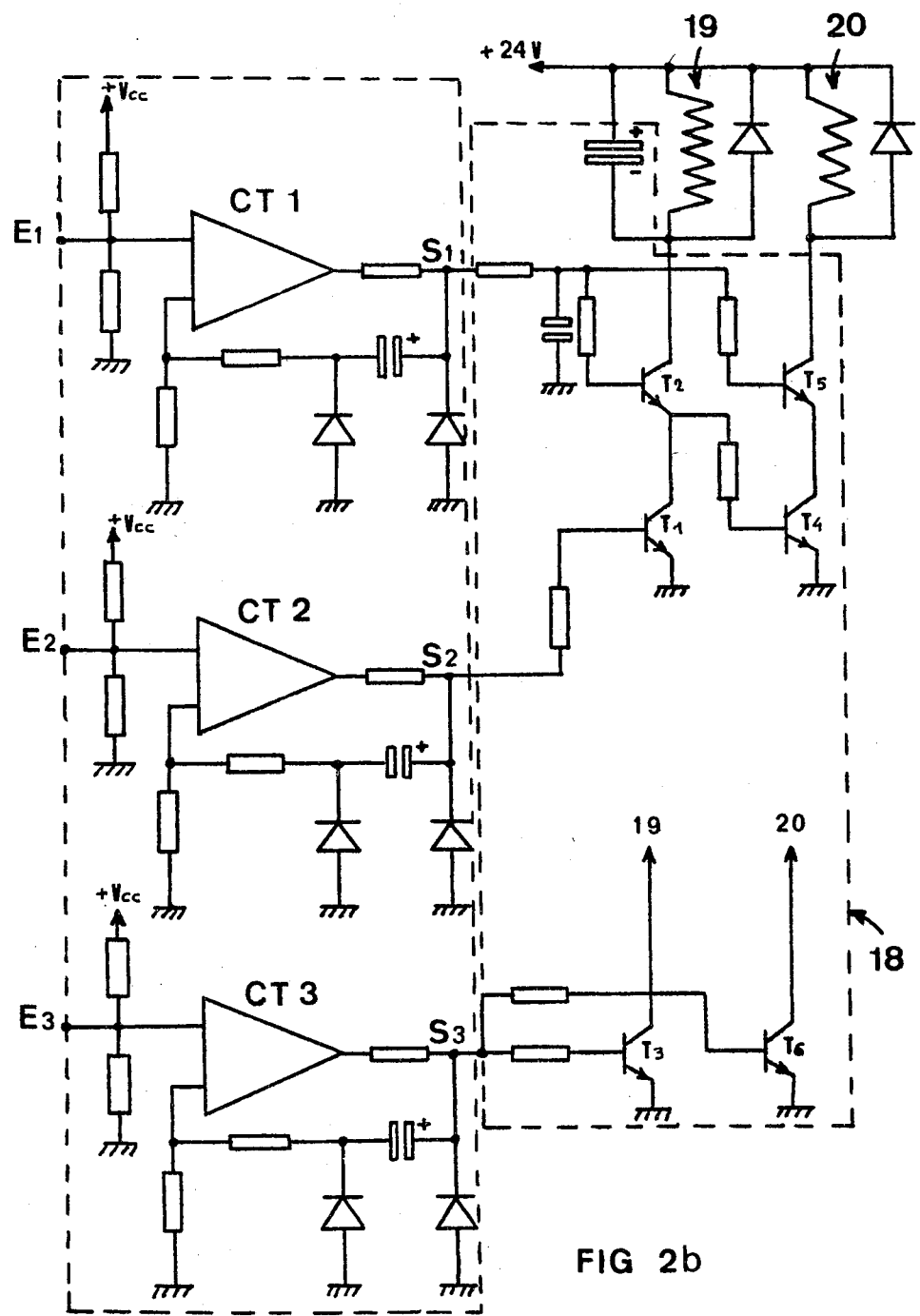

The secondary of the current transformer 2 is connected to a peak load controller 3 per se the circuit diagram of which is illustrated in FIGS. 2a and 2b.

Since there are two heating areas Z1 and Z2 the peak load controller 3 comprises two outputs each connected to a relay assigned to one of the areas Z1,Z2. FIG. 1 only shows switch 4 controlled by one of the relays assigned to area Z1 and switch 5 controlled by the other relay assigned to area Z2.

$a_1$ trough $f_1$ are a plurality of output terminals of the peak load control apparatus 1 adapted to be connected by pilot wires to various radiators of the area Z1. Likewise, the output terminals $a_2$ through $f_2$ are assigned to area Z2.

In area Z1 radiator $R_1$, which is not controlled, will be connected by its terminal Pg1 to terminal $a_1$. On the other hand, controlled radiator $R_2$ will be connected by its terminal Pg2 to peak load control terminal $d_1$. Similarly, Pg3 will be connected to terminal $a_2$ and Pg4 to peak load control terminal $d_2$.

If heating areas Z1 and Z2 comprise more radiators, they will be connected in the same way to different terminals of the peak load control apparatus 1.

The signals provided by the peak load control apparatus 1 to the radiators are picked up on feeder line L by means of a divider resistance bridge 6.

The illustrated heating system provides four heating modes for each of two heating areas Z1, Z2, namely, an automatic mode (A), normal mode (N), economy mode (E) and no-freeze mode (HG).

To this end a selector switch S1,S2 is provided for each area Z1,Z2 for selecting one of the four mode positions or contacts A,N,E,HG for each of the heating areas.

Each of the contacts A is connected to a movable contact member 7 and 8 respectively controlled by a quartz timer H1, H2 with standby power. Each of timer H1,H2 is adapted to connect feeder line L to terminal 9 (normal operating mode) or to the terminal 10 (economy operating mode).

Contacts N and E are respectively connected to terminals 9 and 10 and contacts HG to terminal 11 (no-freeze operating mode). Next to terminals 9 through 11 are represented the configurations of the signals picked up from the feeder line shaped by the appropriate diodes.

The timers H1 and H2 and selector switches S1 and S2 are arranged side by side on the front face of the control cabinet.

The circuit diagram for the peak load controller 3 is illustrated in detail in FIGS. 2a and 2b. The peak load controller comprises an integrator 12 connected by a filter 13 to a current transformer 2. In association with the filter 13 the integrator 12 serves to eliminate any momentary overcurrent (an overcurrent of very short duration, a few microseconds, due for example to the surge current of an inductive element). It enables accidental triggering of the peak load controller to be avoided.

The output of the integrator 12 is connected to a peak load trigger means 14 comprising a comparator defining the peak load trigger value for the controller by adjusting a variable resistor or potentiometer 15. The output of the flip-flop 16 comprising the comparator is connected to three output terminals. One of the outputs is connected to an enabling circuit for simultaneously cutting out heating areas Z1 and Z2. The other two outputs polarized by suitable diodes are connected to inputs E1 and E2 of the two time control means or stages CT1 and CT2 (see FIG. 2b).

The output of the enabling circuit 17 is connected to the input E3 of a third time control means or stage CT3. The three time control stages CT1 and CT2 and CT3 are composed of monostables, each determining the length of the period during which power is cut off.

The output S1 through S3 of the stages are connected to a control logic circuit 18, relays 19 and 20 controlling switches 4 and 5 respectively. Output S1 is also connected to the input of the flip-flop defined by circuit 17. Control logic circuit 18 comprises transistor stages for controlling the excitation of the coils of relays 19 and 20.

The operation of the above illustrated and described heating system is as follows.

First of all, since the heating system is provided with three operating modes (normal N, economy E and no-freeze HG) the thermostats Th1 through Th4 are preset or programmed to provide, as it is known, at the respective radiators normal operating mode with a temperature control range from 5°-32° C., economy operating mode with a temperature control range from 5°-27° C., or no-freeze operating mode with a controlled temperature set, for example, at 5° C.

The various control signals for these operating modes are represented at terminals 9-11 in FIG. 1 and are applied at the associated radiators by means of selector switches S1, S2 whose positions are controlled at will.

In the positions of switches 4 and 5 shown in FIG. 1 all the thermostats Th1 through Th4 are connected to one of the terminals 9-11.

The function of timers H1 and H2 when selector switches S1 or S2 are in their position A (automatic operating mode) is to permit the changeover from off-peak hours mode (economy mode terminal 10) to peak hours mode (normal mode terminal 9).

The transformer 2 constantly provides the peak controller 3 with a demand signal porportional to the feeder line power consumed by the radiators.

As soon as the preselected peak load determined by the position of potentiometer 15 in circuit 14 is reached and its duration is sufficiently long, the circuit 14 triggers the time control stage CT1 which causes the energization of the coil 19 of the relay controlling switch 4.

The switch 4 is then in position HG corresponding to a very low supply of radiator $R_2$ for a predetermined period determined by the time delay of the monostable. During this period the supply of the other radiators is not changed so that the overall current carried by feeder line L is brought below the predetermined load current.

After 100 seconds, for example, the transistors of the logic circuit change state and control the energization of the coil 20 of the relay controlling switch 5 for the heating area Z2 and deenergizing coil 19, the deenergization is slightly delayed as a capacitor is connected in parallel so that radiator $R_4$ is cut out until just before radiator $R_2$ is turned back on so as to avoid producing an overload.

After 220 seconds, for example, of energization of the relay of coil 20, the relay is restored to its initial state and the radiators are all once again "on".

If the current in feeder line L again exceeds the predetermined peak level the cutout cycle (radiator $R_2$ for about 100 seconds, then radiator $R_4$ for about 220 seconds) is automatically started again and as many times as necessary, if not, the peak load controller 3 stays in its standby position until the load current exceeds the predetermined peak value.

The duration of the cutout cycle in the illustrated example is of the order of 5 min. which in the case of successive or repeated cutout, avoids temperature differentials between rooms which would have otherwise occurred if the cutout period were too long for one or more radiators of a given room.

If, at the end of the period of energization of the coil 19 the detected load current exceeds the predetermined peak load or if during the cutout cycle there is an overload, circuit 17 triggers time control means CT3 wich simultaneously cuts out both heating areas Z1 and Z2 maintaining coils 19 and 20 simultaneously energized for a period of, for example, 50 seconds. At the end of this period coil 20 is deenergized and if no over load is detected the cutout cycle proceeds until its end as described above (in other words, radiator $R_4$ is turned off and radiator $R_2$ is turned back on).

If on the contrary the overload continues, coil 20 is reenergized for another 50 seconds period then the normal cycle is resumed. The simultaneous cutting out of heating areas Z1 and Z2 is repeated for 50 seconds intervals until the overload disappears.

The heating system of FIG. 1 may, in simplified versions, comprise neither simultaneous control circuit for cutting out two different heating areas simultaneously nor any operating mode selection.

Of course controller 3 carries out its function in all respective positions of selector switches S1 and S2 and timer switches 7 and 8.

Finally, the invention is not limited to the illustrated and described embodiment, on the contrary one skilled in the art will understand that it admits of various modifications and alternatives without departing from the scope of the invention. Such modifications include, inter alia, the grouping of various radiators or other electric heating units, the connection of the various cutout area controlled by a peak load controller, the structure and operation of the various circuits providing the basic function or the peak load controller.

What is claimed is:

1. A peak load control apparatus for use with an electric heating system comprising a plurality of electric heating units, said peak load control apparatus comprising detection means for detecting current to a feeder line for the electric heating units and providing a signal proportional to the current in the feeder line, a peak load trigger means connected to said detection means for delivering a signal when the signal provided by said detection means exceeds a predetermined adjustable value, first time control means comprising a flip-flop interposed between said peak load trigger means and a selected first group of the electric heating units for a predetermined adjustable period, second time control means comprising another flip-flop interposed between said peak load trigger means and a selected second group of electric heating units for cutting off power to the second group of electric heating units for a predetermined adjustable period substantially at the end of the predetermined period during which power to the first group of electric heating units is cut off, relay means for controlling each group of electric heating units energized from one of said time control means and actuating a switch arranged in pilot circuits of each of said groups of electric heating units, and an enabling circuit for simultaneously cutting off power to the first and second groups of electric heating units, said enabling circuit being connected to said peak load trigger means and third time control means for simultaneously energizing said relay means.

2. A peak load control apparatus as in claim 1 and wherein said peak load trigger means comprises a flip-flop, one of the inputs of said flip-flop being connected to and controlled by a variable resistor.

3. A peak load control apparatus as in claim 1 or 2 and wherein a programmable thermostat associated with each electric heating unit and connected by a pilot circuit to an operating mode selector switch means for selecting an operating mode including an automatic operating mode, said selector switch means in said automatic operating mode being coupled to a timer switch and being connected between the feeder line and said pilot circuits.

4. A peak load control apparatus as in claim 3 and wherein said first and second time control means are selectively energized in accordance with a predetermined cycle, the total duration and duration of the phases thereof being selectively adjustable.

* * * * *

UNITED STATES PATENT AND TRADEMARK OFFICE
CERTIFICATE OF CORRECTION

PATENT NO. : 4,446,359

DATED : May 1, 1984

INVENTOR(S) : ARRIBAS et al.

It is certified that error appears in the above-identified patent and that said Letters Patent is hereby corrected as shown below:

Claim 1, line 12, after "for" insert --cutting off power to the first group of electric heating units for--.

Signed and Sealed this

Thirteenth Day of November 1984

[SEAL]

Attest:

GERALD J. MOSSINGHOFF

Attesting Officer    Commissioner of Patents and Trademarks